United States Patent
Raghavan (10) Patent No.: US 6,415,003 B1
(45) Date of Patent: Jul. 2, 2002

(54) DIGITAL BASELINE WANDER CORRECTION CIRCUIT

(75) Inventor: Sreen A. Raghavan, La Jolla, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/151,525

(22) Filed: Sep. 11, 1998

(51) Int. Cl.$^7$ .......................... H04L 25/06; H04L 25/10

(52) U.S. Cl. ...................... 375/317; 327/307; 375/232

(58) Field of Search ................................ 375/232, 233, 375/316, 319, 345, 346, 350, 317; 333/28 R; 327/307; 708/323

(56) References Cited

U.S. PATENT DOCUMENTS

| | | | |
|---|---|---|---|
| 4,456,893 A | 6/1984 | Otani | 333/18 |
| 4,701,936 A | 10/1987 | Clark | 375/14 |
| 4,888,560 A | 12/1989 | Ogura | 330/254 |
| 4,974,185 A | 11/1990 | Ohno et al. | 364/724 |
| 5,031,194 A | 7/1991 | Crespo | 375/14 |
| 5,119,196 A | 6/1992 | Ayanoglu | 358/167 |
| 5,245,291 A | 9/1993 | Fujimura | 324/617 |
| 5,291,499 A | 3/1994 | Behrens et al. | 371/43 |
| 5,465,272 A * | 11/1995 | Smith | 375/295 |
| 5,481,564 A | 1/1996 | Kakuishi | 375/230 |
| 5,502,735 A | 3/1996 | Cooper | 371/43 |
| 5,602,507 A | 2/1997 | Suzuki | 329/304 |
| 5,617,450 A | 4/1997 | Kakuishi | 375/230 |
| 5,638,065 A | 6/1997 | Hassner et al. | 341/59 |
| 5,654,667 A | 8/1997 | Adachi | 329/306 |
| 5,809,079 A | 9/1998 | Hayashi | 375/262 |
| 5,818,378 A * | 10/1998 | Cheng et al. | 341/155 |

(List continued on next page.)

FOREIGN PATENT DOCUMENTS

| | | | | |
|---|---|---|---|---|
| DE | 196 26 076 A1 | 1/1997 | .......... | H03M/13/12 |
| EP | 0410399 A2 | 1/1991 | ............ | H04N/5/44 |
| JP | 2-215236 | 8/1990 | .......... | H04B/7/005 |
| JP | 6-334692 | 12/1994 | .......... | H04L/25/08 |
| JP | 08172366 A | 12/1994 | .......... | H03M/13/12 |
| JP | 8-116275 | 5/1996 | .......... | H04L/25/08 |
| JP | 9-148944 | 6/1997 | .......... | H03M/13/12 |
| JP | 09-153845 | 6/1997 | ............ | H04B/3/04 |
| JP | 409153845 A * | 6/1997 | | |
| WO | WO 97/11544 | 3/1997 | .......... | H04L/25/03 |

OTHER PUBLICATIONS

Lee, E.A. et al., "Digital Communications", 1988, pp. 34–42.

Lee, E.A. et. al., "Digital Communications", 1988, pp. 319–345.

Sklar, B., "Digital Communications, Fundamentals and Applications", 1988, pp. 333–337.

Oppenheim, A.V. et al., "Discrete–Time SIgnal Processing", 1989, pp. 149–191.

(List continued on next page.)

Primary Examiner—Jean Corrielus
(74) Attorney, Agent, or Firm—Skjerven Morrill LLP; Gary J. Edwards (57) ABSTRACT

In a data communications system, a digitally implemented correction for baseline wander and the receipt of killer packets resulting from coupling transformers in the transmission channel is presented. The baseline wander correction is accomplished in a feedback loop that does not depend on models of the coupling transformers between the transmitter and the transport media and the receiver and the transport media. Additionally, a digital response to killer packets is presented that does not require the use of higher resolution analog-to-digital converters and does not require the use of a lower resolution in the analog-to-digital converter of the receiver. Instead, the reference voltage of the analog-to-digital converter is adjusted for short cables, where killer packets are a problem.

15 Claims, 4 Drawing Sheets

U.S. PATENT DOCUMENTS

| | | | |
|---|---|---|---|
| 5,841,478 A | 11/1998 | Hu | 348/426 |
| 5,841,484 A | 11/1998 | Hulyalker et al. | 348/607 |
| 5,859,861 A | 1/1999 | Oh | 371/43.7 |
| 5,872,668 A * | 2/1999 | Muto | 360/65 |
| 5,895,479 A | 4/1999 | Suganuma | 708/301 |
| 5,909,384 A * | 6/1999 | Tal et al. | |
| 5,940,442 A * | 8/1999 | Wong et al. | 375/232 |
| 5,949,819 A * | 9/1999 | Bjarnason et al. | 375/222 |
| 5,960,011 A | 9/1999 | Oh | 371/46 |
| 5,982,818 A | 11/1999 | Kreuger et al. | 375/265 |
| 5,986,831 A * | 11/1999 | Muto | 360/46 |
| 6,035,007 A | 3/2000 | Khayrallah et al. | 375/341 |
| 6,038,269 A | 3/2000 | Raghaven | 375/340 |
| 6,047,022 A * | 4/2000 | Reuven | 375/222 |
| 6,115,418 A | 9/2000 | Raghavan | 375/233 |
| 6,148,046 A * | 11/2000 | Hussein et al. | 375/345 |

OTHER PUBLICATIONS

American National Standard for Information Systems, "Fibre Distributed Data Interface (FDDI)—Part: Token ring twisted pair physical layer medium dependent (TP–PMD)", Mar. 1, 1995, pp. 239–330.

IEEE Standards for Local and Metropolitan Area Networks: "Supplement to Carrier Sense Multiple Access with Collision Detection (CSMA/CD) Access Method and Physical Layer Specifications", IEEE Std 802.3u–1995, pp. 1–393.

IEEE *Draft*P802.3ab/D1.1, "Physical layer specification for 1000 Mb/s operation on four pairs of Category 5 or better balanced twisted pair cable (1000B ASE–T)", Dec. 10, 1997, pp. 40–125. through 40–125.

* cited by examiner

DIGITAL BASELINE WANDER CORRECTION CIRCUIT

BACKGROUND

1. Field of the Invention

This invention relates to digital communication systems and, more particularly, to correction of baseline wander in baseband transceiver systems.

2. Background of the Invention

The dramatic increase in desktop computing power driven by intranet-based operations and the increased demand for time-sensitive delivery between users has spurred development of high speed Ethernet local area networks (LANs). 100 BASE-TX Ethernet (see IEEE Std. 802.3u-1995 CSMA/CD Access Method, Type 100 Base-T) using existing category 5 (CAT-5) copper wire, and the newly developing 1000 BASE-T Ethernet (see IEEE Draft P802.3ab/ D4.0 Physical Layer Specification for 1000 Mb/s Operation on Four Pairs of Category 5 or Better Twisted Pair Cable (1000 Base-T)) for Gigabit/s transfer of data over category 5 data grade copper wiring, require new techniques in high speed symbol processing. On category 5 cabling, gigabit per second transfer can be accomplished utilizing four twisted pairs and a 125 megasymbol/s transfer rate on each pair where each symbol represents two bits.

Physically, data is transferred using a set of voltage pulses where each voltage represents one or more bits of data. Each voltage in the set is referred to as a symbol and the whole set of voltages is referred to as a symbol alphabet.

One well-known system of transferring data at high rates is Non Return to Zero (NRZ) signaling. In binary NRZ signaling, the symbol alphabet {A} is {−1, +1}. A logical "1" is transmitted as a positive voltage while a logical "0" is transmitted as a negative voltage. At 125 M symbols/s, the pulse width of each symbol (the positive or negative voltage) is 8 ns.

An alternative well-known modulation method for high speed symbol transfer is MLT3 and involves a three level system. (See American National Standard Information system, Fibre Distributed Data Interface (FDDI)—Part: Token Ring Twisted Pair Physical Layer Medium Dependent (TP-PMD), ANSI X3.263:1995). The symbol alphabet for MLT3 is {A}={−1, 0, +1}. In MLT3 transmission, a logical 1 is transmitted by either a −1 or a +1 while a logic 0 is transmitted as a 0. A transmission of two consecutive logic "1"s does not require the system to pass through zero in the transition. A transmission of the logical sequence ("1", "0", "1") would result in transmission of the symbols (+1, 0, −1) or (−1, 0, +1), depending on the symbols transmitted prior to this sequence. If the symbol transmitted immediately prior to the sequence was a +1, then the symbols (+1, 0, −1) are transmitted. If the symbol transmitted before this sequence was a −1, then the symbols (−1, 0, +1) are transmitted. If the symbol transmitted immediately before this sequence was a 0, then the first symbol of the sequence transmitted will be a +1 if the previous logical "1" was transmitted as a −1 and will be a −1 if the previous logical "1" was transmitted as a +1. The actual voltage levels that are transmitted are typically +1 V, 0 V and −1 V for the +1 symbol, the 0 symbol and the −1 symbol, respectively.

The detection system in the MLT3 standard, however, needs to distinguish between 3 levels, instead of two levels in a more typical two level system. The signal to noise ratio required to achieve a particular bit error rate is higher for MLT3 signaling than for two level systems. The advantage of the MLT3 system, however, is that the energy spectrum of the emitted radiation from the MLT3 system is concentrated at lower frequencies and therefore more easily meets FCC radiation emission standards for transmission over twisted pair cables. Other communication systems may use a symbol alphabet having more than two voltage levels in the physical layer in order to transmit multiple bits of data using each individual symbol. In Gigabit Ethernet over twisted pair CAT-5 cabling, for example, 5-level pulse amplitude modulated (PAM) data with partial response shaping is transmitted at a baud rate of 125 Mbaud. (See IEEE Draft P802.3ab/D4.0 Physical Layer Specification for 1000 Mb/s Operation on Four Pairs of Category 5 or Better Twisted Pair Cable (1000 Base-T)).

Figure 1A:
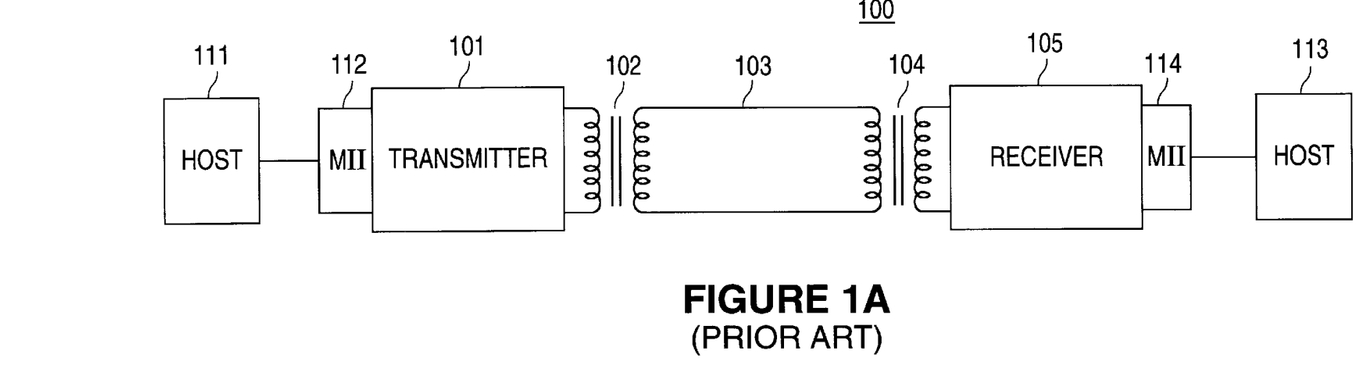
FIG. 1A is a block diagram of a known transceiver system.

FIG. 1A shows a typical transmission system 100 for transmitting data at high rates over conventional twisted copper pair wiring. Transmission system 100 includes a transmitter 101, a transmit coupler 102, a transmission channel 103, a receive coupler 104 and a receiver 105. The transmitter 101 receives data in the form of a symbol stream from a host 111 through a medium independent interface (MII) 112 and couples the modulated data into transmission medium 103 through transmit coupler 102. Receive coupler 104 receives a modulated waveform from transmission medium 103 and couples the modulated waveform into receiver 105. The modulated waveform received in receiver 105 suffers from the effects of intersymbol interference (ISI) caused by channel distortion, transmit and receiver filters in transmitter 101 and receiver 105, and couplers 102 and 104. Receiver 105 outputs the received data, after correcting for channel distortion, to host 113, via a medium independent interface 114.

Intersymbol interference can be compensated for by equalization in receiver 105. However, some of the effects resulting from couplers 102 and 104, which are typically transformers, are not compensated adequately by equalization in receiver 105. These effects include baseline wander and killer packets.

Baseline wander refers to the result of a transmission, in baseband transceiver systems, of symbols where most of the symbols are of identical polarity, for example, in MLT-3 transmission a long series of ones or negative ones. In that case, the output signal from transmitter 101 appears to be a DC signal (a constant 1 V is transmitted by transmitter 101 if a long series of +1 symbols is transmitted). In general, the baseline of the transmit signal is shifted up or down based on the polarity of the transmitted data. Couplers 102 and 104 are typically inductors and, therefore, do not pass DC voltages. The net effect is that the input signal to receiver 105 suffers an exponential decay, called droop or "baseline wander", eventually resulting in increased error rates in the receiver if the baseline wander effect is not adequately compensated.

In addition, some particular data sequences result in peak-to-peak voltage levels at the receiver that are much higher than other data sequences. For example, even though transmitter 101 outputs a signal having a peak-to-peak voltage of 2 V, because of the effects of couplers 102 and 104 the input signal at receiver 105 can be as high as about 4 V peak-to-peak in response to certain sequences of symbols. A sequence of transmitted symbols that results in particularly high peak-to-peak voltages at receiver 105 is referred to as a "killer packet." An example of a killer packet satisfying the transmission constraints of a 100 BaseTX system is given in American National Standard for Information Systems, ANSI X3.263:1995, Fibre Distribued Data Interface (FDDI)— Part: Token Ring Twisted Pair Physical Layer Medium Dependent (TP-PMD), March 1995.

In order to process symbol streams that include killer packets, analog-to-digital converters in receiver 105 are required to receive even the statistically less likely, but higher voltage level, signals that result from such packets. This results in either an increased cost for analog-to-digital conversion (i.e., utilization of higher resolution analog-to-digital converters), a loss of resolution of the receiver detection circuitry by setting the resolution of the analog-to-digital converter low enough to include the higher range of voltages, or allowing the analog-to-digital converter to clip the input signal resulting from killer packets. All of the above solutions are, therefore, undesirable.

Figure 1B:
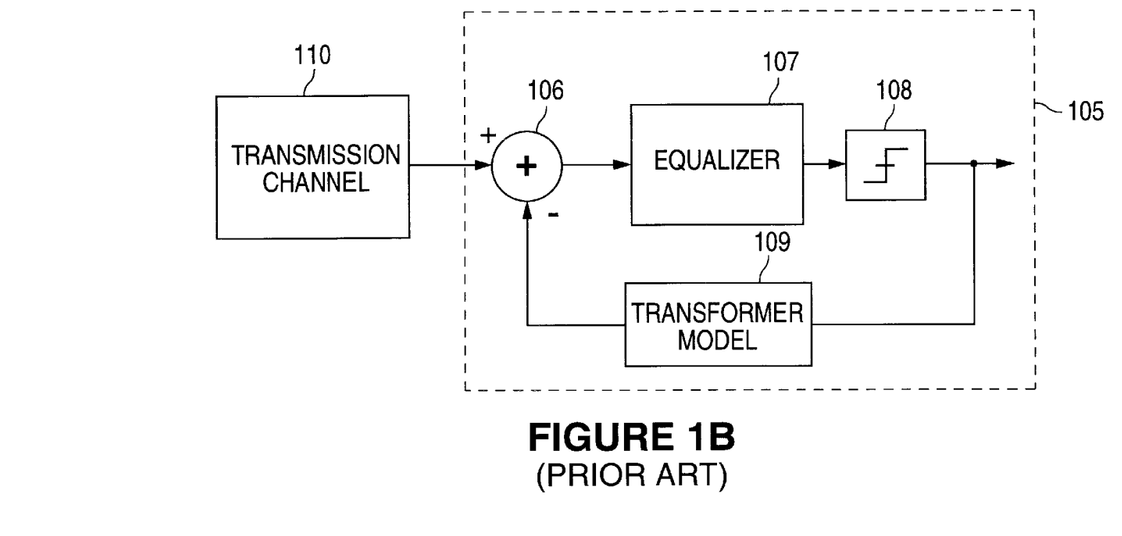
FIG. 1B shows a known correction circuit that allows the receiver shown in FIG. 1 to correct for baseline wander and to receive killer packets.

Corrections for baseline wander and receipt of killer packets have depended on a model of the transformer and have been implemented, at least partially, with analog circuitry. FIG. 1B shows a correction circuit that is commonly used. Receiver 105 receives signals from a transmission channel 110. The signals from transmission channel 110 include distortion from filters in transmitter 101 (FIG. 1A), filters in receiver 105, intersymbol interference (ISI) from the transport medium, and the effects of couplers 102 and 104. The signal is corrected for the effects of the couplers 102 and 104 in adder 106 and equalized in equalizer 107 (FIG. 1B). Slicer 108 receives the signals from equalizer 107 and decides on an output symbol stream.

The output symbol stream is received by transformer modeler 109 that executes a transfer function that corrects for the effects of couplers 102 and 104. The transfer function includes corrections for baseline wander and for receipt of killer packets. This approach to correction, usually accomplished in an analog circuit, depends on the transformer and relies on the transformer model transfer function being accurate. The correction, i.e. adder 106, is accomplished before any analog-to-digital conversion of the signal, resulting in the need for analog circuitry or a digital-to-analog converter if the correction is calculated digitally. The analog implementation usually defeats the higher reliability and increased economic savings of a digital signal processing implementation.

Therefore, a receiver that digitally corrects for baseline wander and that is independent of the actual coupling transformers is desirable. In addition, a receiver that receives "killer" packets without a subsequent loss of resolution for the analog-to-digital conversion, without using a more expensive analog-to-digital converter, and without resorting to an analog implementation of a correction circuit is desirable.

SUMMARY

In accordance with the invention, a receiver of a communications system includes a digital baseline wander circuit. In one embodiment, the receiver includes an analog-to-digital converter, coupled to receive signals from a transport channel and outputting a sample, and a slicer that receives the sample and outputs a symbol. The baseline wander circuit receives the output symbol from the slicer and the input sample to the slicer, digitally executes a transfer function that outputs a baseline correction estimate, and corrects the output sample of the analog-to-digital converter using the baseline correction estimate.

The baseline wander circuit, according to this invention, is implemented digitally and is responsive to the input signals of the receiver. The implementation does not depend on a model of the coupling transformers used to couple the transmitter and the receiver to the transport media.

In some embodiments, an equalizer is coupled between the analog-to-digital converter and the slicer. The equalizer can include a linear equalizer or a decision feedback equalizer. The baseline wander circuit corrects the output of the analog-to-digital converter before the signal is received by the equalizer.

Another embodiment of the invention includes the ability to receive killer packets. The receiver includes an A/D reference voltage circuit that, based on an indication of the cable length, adjusts the reference voltage of the A/D converter of the receiver in preparation for receiving the higher peak-to-peak voltages of killer packets. In one embodiment, the gain from a gain control circuit indicates the cable length. In other embodiments, adaptively chosen equalizer parameters can be utilized to indicate the cable length.

These embodiments are further discussed below in relation to the following figures.

DETAILED DESCRIPTION OF THE INVENTION

Figure 2:
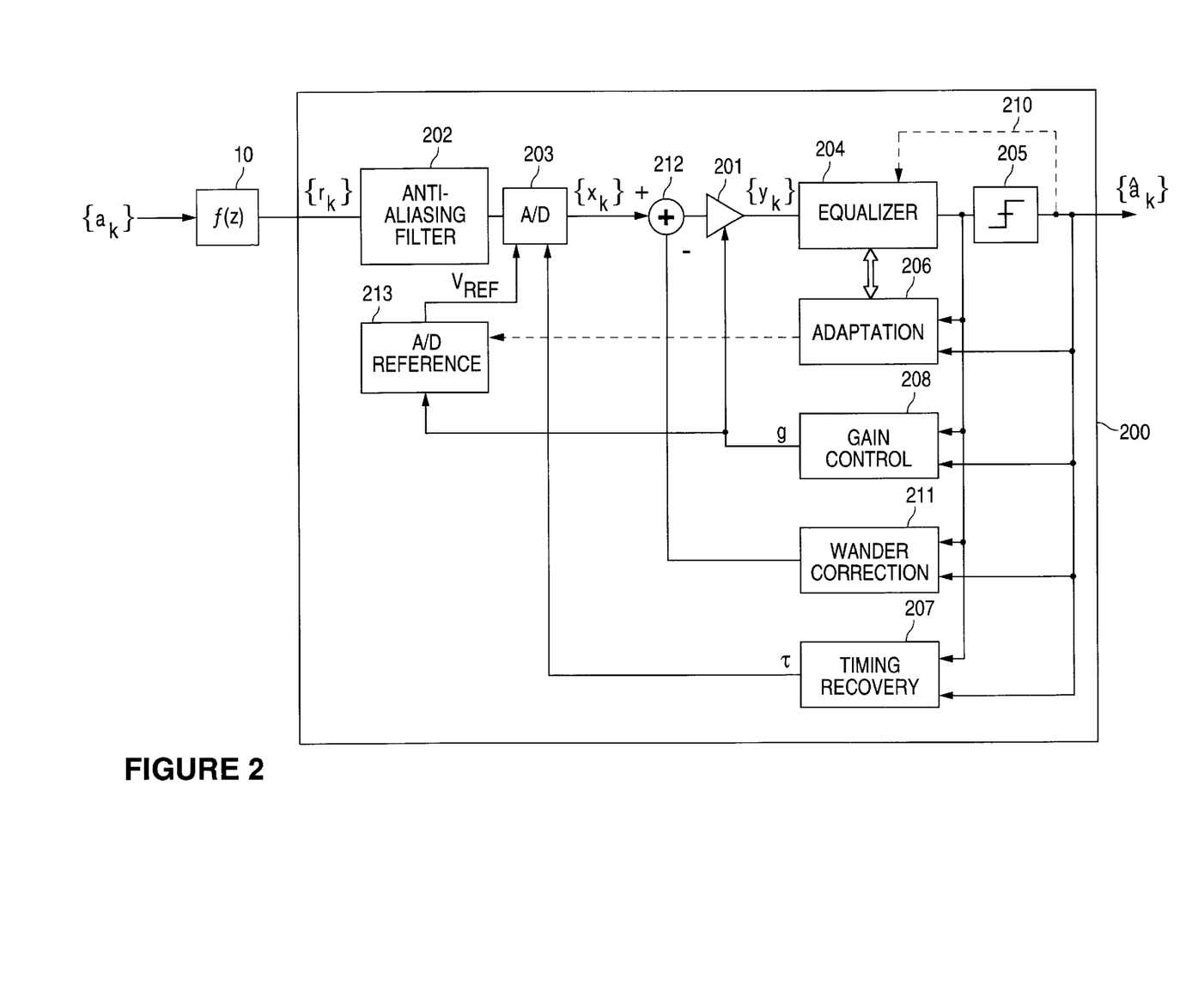
FIG. 2 shows a receiver according to the present invention.

FIG. 2 shows in a block diagram an embodiment of a baseband receiver system 200 according to the present invention. Receiver system 200 includes, in series, anti-aliasing filter 202, analog-to-digital converter (ADC) 203, adder 212, amplifier 201, equalizer 204 and slicer 205. One skilled in the art will recognize that the components of the receiver system may be ordered differently, for example amplifier 201 may be implemented before anti-aliasing filter 202. Parameters to control the elements of receiver 200 are determined by other receiver components: Adaptation 206 determines the equalizer coefficients of equalizer 204; gain control 208 determines the gain g of amplifier 201; wander correction element 211 determines the amount of wander subtracted from the output signal of ADC 203 by adder 212; and timing recovery determines the timing coefficient of ADC 203.

An input symbol stream $\{a_k\}$ is input to transmission channel 10 by a transmitter (not shown). Transmission channel 10 represents twisted copper pair, or some other transmission medium such as coaxial cable or optical fiber, and couplers 102 and 104 (FIG. 1A). In FIG. 2, the symbol stream $\{a_k\}$ can be NRZ, MLT3 or any other symbol alphabet and modulation that are used in transceivers of this type. The transmitted symbols in the sequence $\{a_k\}$ are members of the symbol alphabet $\{A\}$. In the case of two level NRZ signaling, the symbol alphabet $\{A\}$ is given by $\{-1, +1\}$. The index k represents the time index for that symbol, i.e. at sample time k, the symbol being transmitted to transmission channel 10 is given by $a_k$. The channel response is represented by the channel function f(z). The signal, suffering from channel distortion, random noise, and a flat signal loss, is received by receiver 200.

For the sake of simplicity, a baseband transmission system is assumed, although the techniques shown are easily extended to a passband transmission system. (See E. A. LEE AND D. G. MESSERCHMITT, DIGITAL COMMUNICATIONS (1988)) It is also assumed that the channel model includes the effect of transmit and receive filtering. In addition, the transmission channel is assumed to be linear in that two overlapping signals simply add as a linear superposition. The Z-transform, (see A. V. OPPENHEIM & R. W. SCHAFER, DISCRETE-TIME SIGNAL PROCESSING (1989)), of the sampled transmission channel is given by the channel function polynomial $$f(Z)=f_0+f_1Z^{-1}+f_2Z^{-2}+\ldots+f_NZ^{-N}, \qquad (1)$$

where $f_0, \ldots, f_j, \ldots, f_N$ are the polynomial coefficients representing the dispersed component of the (k–j)th symbol present in the $a_k$th symbol and N is a cut-off integer such that $f_j$ for j>N is negligible. The polynomial f(Z) represents the Z-transformation of the frequency response of the transmission channel. ($Z^{-1}$ represents a one period delay). (See A. V. OPPENHEIM & R. W. SCHAFER, DISCRETE-TIME SIGNAL PROCESSING (1989)).

The noiseless output of the channel at sample time k is then given by $$r_k=f_0*a_k+f_1*a_{k-1}+\ldots+f_N*a_{k-N}, \qquad (2)$$

where, without loss of generality, $f_0$ can be assumed to be 1. Thus, the channel output signal at time k depends, not only on transmitted data at time k, but past values of the transmitted data. This effect is known as "intersymbol interference" (ISI). (See LEE & MESSERSCHMITT).

Intersymbol interference is a result of the dispersive nature of the communication channel. The IEEE LAN standards require that systems be capable of transmitting and receiving data through at least a 100 meter cable. In a 100 meter cable, the signal strength at the Nyquist frequency of 62.5 Mhz is reduced nearly 20 db at the receiving end of the cable. Given this dispersion, a single symbol may affect symbols throughout the transmission cable.

The noise element of the input signal is represented by the sequence $\{n_k\}$. Therefore, the noisy output of the channel is given by $$x_k=r_k+n_k, \qquad (3)$$

where the noise samples $\{n_k\}$ are assumed to be independent and identically distributed Gaussian random variables (see LEE & MESSERSCHMITT) with variance equal to $\sigma^2$.

In FIG. 2, the output signal stream from transmission channel 10, which is the input symbol sequence $\{a_k\}$ distorted by the channel in the above fashion, is input to anti-aliasing filter 202 of receiver 200. Anti-aliasing filter 202 prevents anti-aliasing by passing the input signal, received from transmission channel 10, through a low pass filter to reject out-of-band noise. As such, any conventional anti-aliasing filter can be utilized as anti-aliasing filter 202. The analog-to-digital converter (ADC) 203 samples and holds the input signal for a duration of the symbol period T, which in one embodiment of the invention is 8 ns although other symbol periods can be used. Techniques for analog-to-digital conversion that can be used in ADC 203 are well known.

In one embodiment, the digitized output signals from A/D converter 203 are corrected by subtracting a baseline wander correction $B^k$ in adder 212 and amplified in digital amplifier 201. The output sample from amplifier 201, then, is given by $$y_k=g(x_k-B^k), \qquad (4)$$

where g is the gain of amplifier 201. One of ordinary skill in the art will recognize that digital amplifier 201 may be located anywhere in the receiver 200 between ADC 203 and equalizer 204. In general, amplifier 201 can also be an analog amplifier located anywhere between transmission channel 10 and ADC 203. Adder 212 is located between A/D converter 203 and equalizer 204.

Amplifier 201 compensates for loss of signal that is experienced in transmission channel 10. The gain g of amplifier 201 is adjusted by gain control 208 in order to optimize the receiver function. An example of known values of g for several cable lengths are given in Table 1. The signal loss in transmission channel 10 depends primarily on cable length and is not dependent on other elements of transmission channel 10. In addition, the value of the gain g is not dependent on the placement of amplifier 201 within receiver 200.

The corrected samples $y_k$ are input to equalizer 204. In equalizer 204, the effects of the channel distortion are countered and equalizer 204 outputs sample $a_k'$. If equalizer 204 is a decision feedback equalizer, then line 210 is inserted to provide the feed-back section of equalizer 204 with the output ssymbols from slicer 205.

TABLE 1

| Cable Length (meters) | Amplifier Gain g (Normalized) |
|---|---|
| 0 | 1.0 |
| 20 | 1.3 |
| 40 | 1.74 |
| 60 | 2.3 |
| 80 | 3.1 |
| 100 | 4.15 |

Equalizer 204 may be any kind of equalizer structure. In general, two types of equalizer appropriate for use in Equalizer 204 are a linear equalizer and a decision feedback equalizer. Equalizers of this type that are applicable to 100 or 1000 BASE-T Ethernet over category-5 wiring, 24 gauge twisted copper pair, are described in "Improved Detection for Digital Communication Receivers," U.S. application Ser. No. 08/974,450, filed Nov. 20, 1997, Sreen A. Raghavan, now U.S. Pat. No. 6,038,269 issued on Mar. 14, 2000, assigned to the same assignee as the present application, herein incorporated by reference in its entirety; and "Simplified Equalizer for Twisted Pair Channel," U.S. application Ser. No. 09/020,628, filed Feb. 9, 1998, Sreen A. Raghavan, now U.S. Pat. No. 6,115,418 issued on Sep. 5, 2000, assigned to the same assignee as the present disclosure, herein incorporated by reference in its entirety.

Slicer 205 inputs sample $a_k'$ from equalizer 204 and decides on the output symbol $â_k$. The structure and operation of slicer 205 depends on the symbol modulation of receiver 200. In one embodiment of the invention using MLT-3 symbols, slicer 205 defines the output symbol $\hat{a}_k$ (assuming that the nominal values for $a_k'$ are $\{1.0, 0.0, -1.0\}$) as:

$$\hat{a}_k = \begin{cases} 1 & a_k' > 0.5 \\ 0 & -0.5 < a_k' < 0.5 \\ -1 & a_k' < -0.5 \end{cases} \quad (5)$$

Other definitions of the output symbol in terms of the input sample are required for other symbol alphabets.

Equalizer multiplier coefficients are adaptively chosen in the coefficient update block 206. Timing recovery 207 tracks the timing of the circuit and adjusts the timing phase τ for the sample and hold function of the analog-to-digital converter (ADC) 203. In most receivers, timing recovery 207 adjusts the timing phase τ by estimating the zero crossings in the signal stream $\{a_k\}$ and comparing the occurrence of those zero crossings with the detected zero-crossings of the input signal.

Gain control 208 adjusts the gain of multiplier 101 by comparing the modulus of sample $a_k'$ with a target threshold value. The gain of multiplier 201 compensates for the channel flat loss factor 1/g.

Assuming that equalizer 204 is arranged to supply no gain to the signal, the signal amplitude is controlled by the automatic gain control (AGC) circuit 208. The automatic gain control circuit 208 sets the average value of the equalized signal to a predetermined constant, regardless of the loss in the cable. The gain g at time k is given by $$g^{k+1} = g^k - \beta e_k \hat{a}_k. \quad (6)$$

The error $e_k$ is the difference between $\hat{a}_k$ and $a_k'$, $$e_k = a'_k - \hat{a}_k. \quad (7)$$

The parameter β determines the rate at which the gain can vary. If set too high, then the gain parameter may be too volatile. However, if β is too low then the system is slow to respond to a need for an altered gain g. In most embodiments of the invention, β is approximately $10^{-3}$. The converged value of the gain g is higher for a longer length cable because the root mean squared (RMS) value of the received signal amplitude decreases as the length of the cable increases. Table 1 shows an example of the correlation between the gain g and the cable length.

Figure 3A:
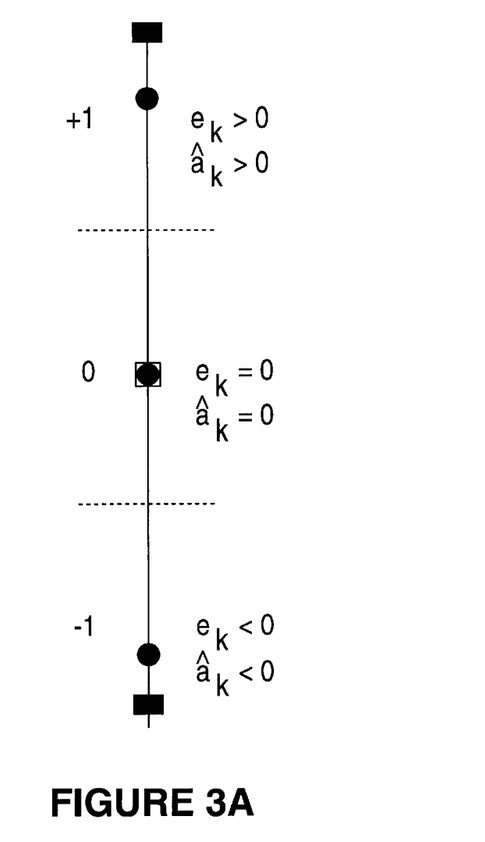
FIG. 3A shows schematically the difference between samples output from the equalizer of the receiver shown in FIG. 2 and symbols from the slicer shown in FIG. 2 that are corrected by the gain control circuit.

FIG. 3A shows diagramatically input samples to slicer 205 and the output symbols from slicer 205 with an MLT3 alphabet for the situation where the gain of amplifier 201 needs adjustment. In FIG. 3A, the darkened squares represent the input samples and the darkened circles represent the decided upon symbols. As is displayed, the input samples are expanded from the decided upon symbols (i.e., the signal voltage of the +1 symbol is too high and the signal voltage of the −1 symbol is too low). In contrast, if the signal voltage for the +1 symbol is too low, then the signal voltage for the −1 symbol is too high. Equation 5, therefore, gives the correction for the gain control that will adjust for this error.

Figure 3B:
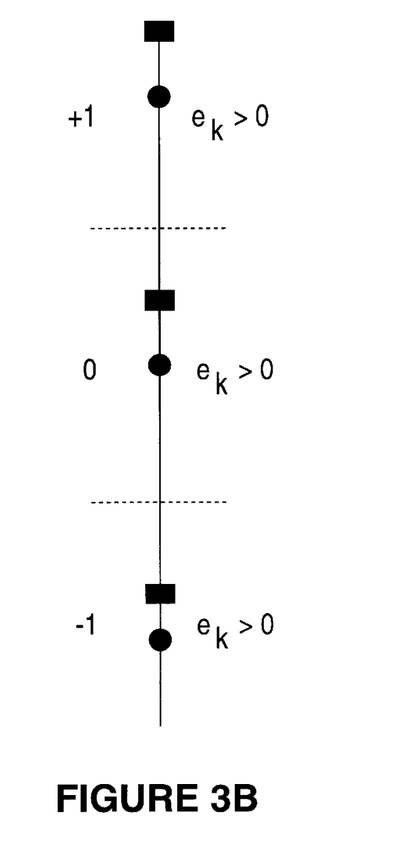
FIG. 3B shows schematically the differences between samples output from the equalizer of FIG. 2 and symbols from the slicer of FIG. 2 that are corrected by the baseline wander correction circuit.

FIG. 3B shows diagramatically the estimation of baseline wander. Each of the signal voltages is shifted in the same direction from the symbols they represent. In FIG. 3B, the signal voltage for the +1 symbol, the 0 symbol and the −1 symbol are all too high since the baseline wander is positive. Additionally, the signal voltages are shifted by the same amount. Therefore, a constant value should be added to each of the samples where the constant value depends on the error itself. The baseline wander correction factor, therefore, is given by $$B^{k+1} = \mu_b e_k + B^k, \quad (8)$$

where $\mu_b$ is the proportionality constant of the correction loop. This update, where $B^k$ is subtracted from the output signal of A/D converter 203, can be performed digitally on equalizer output samples, works well with all the forms of "killer" packets and random data, and cancels small amounts of arithmetic biases in the digital data path. The baseline wander correction is implemented as a first order digital phase locked loop. In some embodiments, adder 212 may add a baseline wander correction instead of subtracting one, resulting in a different baseline correction estimate. The constant $\mu_b$ controls the response time of wander correction element 211.

Figure 4:
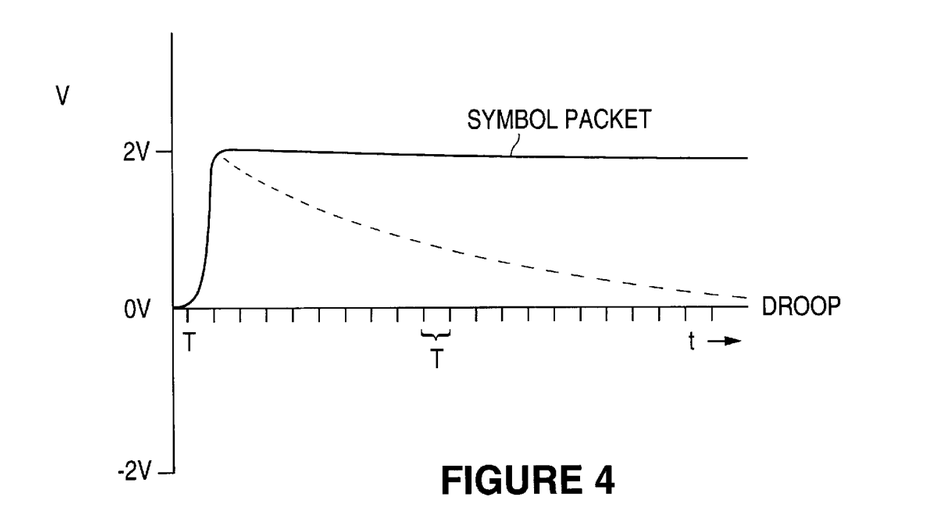
FIG. 4 shows an example symbol packet that is susceptible to baseline wander and the droop that results from that symbol packet.

FIG. 4 shows a graph of the transmitted signal (vertical axis) from transmitter 101 as a function of time t for a series of MLT3 symbols having symbol $\{1\}$ (i.e., $\{A\} = \{1,1,1,1, 1,1,1,1,1 \ldots \})$. Because the symbol A=1 is sent as a baseband 1 V signal, the symbol stream appears as a constant 1 V. Transformers 102 and 104 (FIG. 1), however, act as high-pass filters and do not pass DC voltages. The actual voltage received at receiver 105, therefore, decays with time. The decay is labeled a droop and is shown in FIG. 4 as a dashed line. The voltage sample received at receiver 200 (FIG. 2), under these conditions, droop at the rate of $$V_k = V_0 e^{-2\pi \frac{F_{3dB}}{f_s} k}, \quad (9)$$

where $F_{3\ dB}$ is the bandwidth of the transformer, $f_s$ is the sampling rate and k is the symbol number in the constant series.

Figure 5:
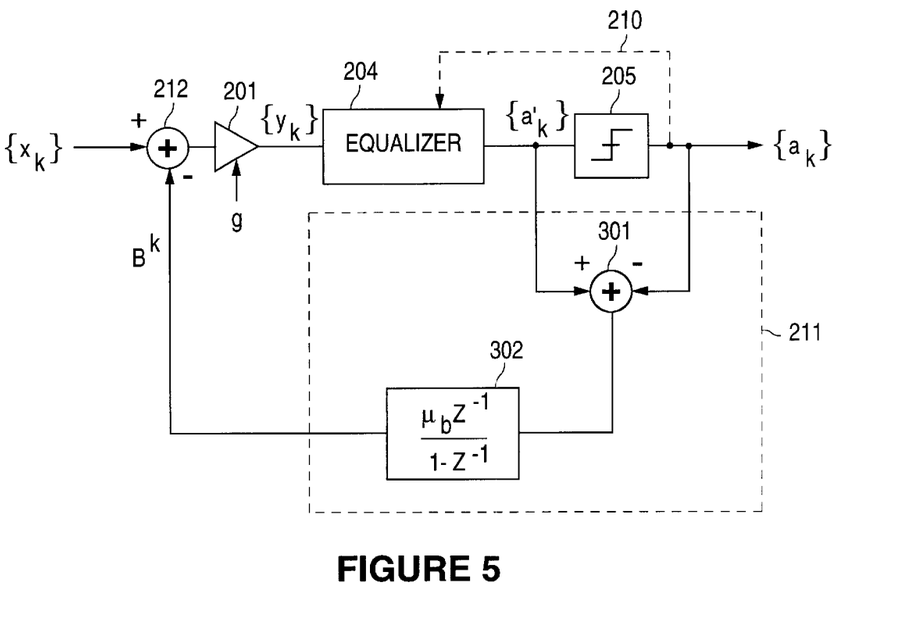
FIG. 5 shows an embodiment of the baseline wander correction circuit according to the present invention.

FIG. 5 shows in a block diagram an embodiment of wander correction element 211 (FIG. 2) for correcting this droop. Wander correction element 211 includes adder 301 and correction block 302 which executes the transfer function $$H(Z) = \frac{\mu_b Z^{-1}}{1 - Z^{-1}}, \quad (10)$$

where $Z^{-1}$ represents a one period delay. An expansion of Equation 10 shows that Equation 10 is an implementation of Equation 8. The closed loop transfer function represents the transfer function $$H_C(Z) = \frac{\text{corrected droop}}{\text{input droop}} = \frac{\mu_b Z^{-1}}{1 - (1 - \mu_b) Z^{-1}}. \quad (11)$$

It can easily be shown that the 3 dB frequency of the first order correction is approximated by $$f_{3dB} = \frac{1}{T} \frac{\mu_b g}{2\pi}, \quad (12)$$

where g is the gain from the gain control 208. If $f_{3\ dB}$ is greater than (by a factor of two or more) the maximum $F_3$ $_{dB}$ of couplers 102 and 104 (FIG. 1A), then the baseline wander correction carried out by the circuit shown in FIG. 5 can occur more quickly than the droop. The correction for baseline wander, therefore, occurs at a rate faster than the droop itself and $y_k$, therefore, does not include any of the effects of the baseline wander. In most embodiments, the maximum $F_{3\ dB}$ of couplers 102 and 104 is of the order of 25 kHz and $f_{3\ dB}$ is chosen to be approximately 100 kHz. With T being 8 ns, then, $\mu_b g$ is approximately 0.05.

In addition, the baseline wander correction according to the present invention does not depend on a model of the transformer and is therefore transformer independent. Additionally, baseline wander correction according to this invention is independent of the automatic gain control correction implemented in gain control 208 (FIG. 2). In FIGS. 4A and 4B, it is clear that the baseline wander element will not react to discrepancies between the output of the equalizer and output symbols from the slicer that require a gain correction because the individual corrections for different symbols will cancel, as shown in FIGS. 3(*a*) and 3(*b*). Gain control 208 will not react to discrepancies that require a baseline wander correction because the baseline wander correction is predicted and executed before gain control 208 has an opportunity to react.

At the conclusion of the packet having constant symbols, the transceiver system makes a transition to a 0 symbol (i.e., { ... 1, 1, 1, 0}). The signal received by receiver 200 will change normally resulting in a continued need to adjust for the baseline wander. For example, after a long series of +1 symbols the input signal to receiver 200 will be nearly 0 V. If the next symbol transmitted is a 0 symbol, then the input signal receiver 200 will drop by about 1 V to −1 V (instead of dropping to 0 V). Therefore, the baseline wander correction $B^k$ implemented by wander correction 211 smoothly corrects the input sample $x_k$ for the continued droop.

In addition to baseline wander, couplers 102 and 104 (FIG. 1A) also introduce the problem of killer packets. The transformer can be modeled as a band pass filter with transfer function given by $$H_{trans}(Z) = \frac{1-Z^{-1}}{1-\beta Z^{-1}}, \tag{13}$$

where β is less than and approximately equal to 1. Equation 13 can be expanded to obtain $$H_{trans}=(1-Z^{-1})(1+\beta Z^{-1}+\beta^2 Z^{-2}+\ldots)=1-(1+\beta)Z^{-1}+\beta(1+\beta)Z^{-2}-\ldots. \tag{14}$$

A symbol stream passing through this transfer function results in an output stream equal to $$x_k=a_k-(1+\beta)a_{k-1}+\beta(1+\beta)a_{k-2}-\beta^2(1+\beta)a_{k-3}. \tag{15}$$

The maximum value for $x_k$ occurs in the sequence {+1, 0, −1, −1, −1, −1 ... }. In that case, $$x_k=1-(0)+\beta-\beta^2+\beta^2-\beta^3+\ldots=1+\beta. \tag{16}$$

Note that, with MLT3 operating at +1 V, 0 V and −1 V, and β approximately 1, the input voltage to receiver 200 is approximately 2V with this "killer" packet input.

Therefore, even though one transmits a 2 V peak-to-peak signal, the input voltage at the receiver, due to the transformers, can be a 4V peak-to-peak signal. In actual systems, (see American National Standard for Information Systems, Fibre Distributed Data Interface (FDDI)—Part: Token Ring Twisted Pair Physical Layer Medium Dependent (TP-PMD), March 1995), signals having a peak-to-peak voltage of approximately 3.5 V can be observed. Therefore, if A/D converter 203 (FIG. 2) does not accept the full range of 4V peak-to-peak, then the A/D converter will clip the signal, resulting in errors at the slicer output. However, use of an A/D converter capable of receiving the entire range of −2 V to +2 V either entails additional expense or loss of resolution. The prior solution of estimating the peak-to-peak voltage for these killer packets and subtracting them from the input of receiver 200 before the analog-to-digital converter defeats much of the purpose of using digital signal processing.

The peak-to-peak voltage of the input signal, however, decreases with increased cable length. Therefore, the 4 V peak-to-peak voltages only occur with short cable lengths. Table II shows the maximum peak-to-peak signal of the input signal resulting from "killer" packets as a function of cable length.

TABLE II

| Cable Length | Maximum peak-to-peak signal |
|---|---|
| 0 m | 4 V |
| 30 m | 3.3 V |
| 70 m | 2.5 V |
| 100 m | 2.4 V |

Figure 6:
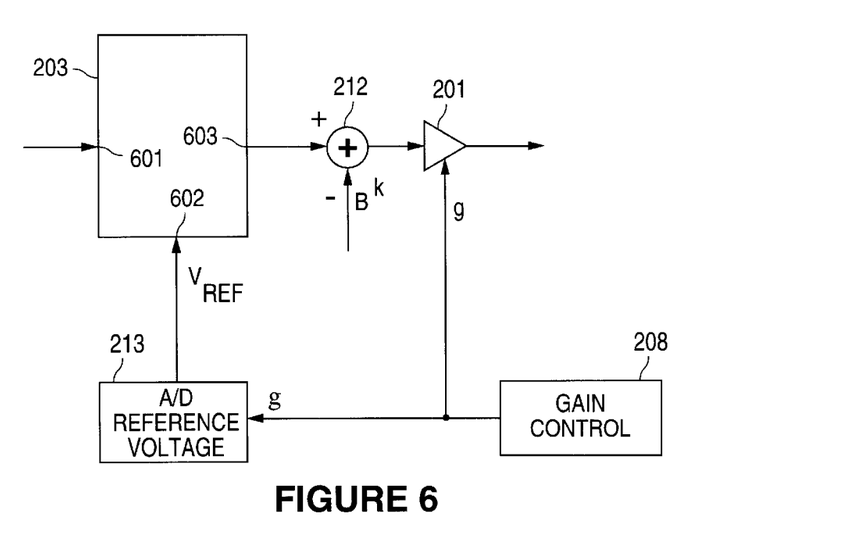
FIG. 6 shows an embodiment of the killer packet receive circuitry according to the present invention.

FIG. 6 shows an embodiment of a correction circuit for adjusting the A/D converter so that it can accommodate high peak-to-peak voltages of "killer" packets on a short cable while not losing the resolution required to receive signals over longer cables. In addition, more expensive high resolution A/D converters are not required.

A/D converter 203 includes an input terminal 601 for receiving an input signal from amplifier 201, an input terminal 602 for receiving a reference voltage, and an output terminal 603 for outputting a digitized signal in response to the input signal and the reference signal. The step size of A/D converter 203 is given by $$\Delta = \frac{2V_{REF}}{2^N}, \tag{17}$$

where $V_{REF}$ is the reference voltage and N is the number of bits used by A/D converter 203. Voltages greater than $V_{REF}$ are clipped by A/D converter 203. In many embodiments of the invention, A/D converter 203 is a 6-bit A/D converter, although A/D converters using other numbers of bits can be utilized.

Embodiments of the invention include A/D reference voltage source 213. In some embodiments, A/D reference voltage source 213 is coupled to gain control circuit 208 to receive the gain. The gain varies predictably as a function of cable length, as shown in Table I. In some embodiments, A/D reference voltage source 213 is coupled to adaptation 206 to receive adaptively chosen equalizer coefficients, which also correlate with cable length.

A/D reference voltage source 213 varies the reference voltage of A/D converter 203 according to cable length or another parameter that correlates with cable length. In one embodiment, the voltage reference is initially set to 2 V and if the gain g is greater than a threshold gain $g_0$ (for example, $g_0$ of about 2.5), then reference voltage source 213 resets the reference voltage to a lower threshold (for example, $V_{REF}$ of about 1.33 V). Other embodiments of the invention allow for a greater number of adjustments to the reference voltage. The number of discrete values for the reference voltage should be arranged so that normal variation in the parameters (i.e., gain g, equalizer coefficients, or calculated length) does not result in inadvertent switching of the reference voltage.

The above examples are demonstrative only and are not intended to be limiting. One skilled in the art will recognize variations in these examples that are within the scope of the invention. One variation is that the components of the receiver shown in FIG. 2 may be implemented in a different order so that amplifier 201, for example, may process input signals before anti-aliasing filter 202. In addition, anti-aliasing filter 202 may be digitally implemented and therefore located between A/D converter 203 and equalizer 204. Another such variation is to alter the symbol alphabet. All of the examples discussed above involved a MLT3 symbol alphabet, but the invention is applicable to transceivers that utilize any symbol alphabet. These variations are intended to be within the scope of this invention. Accordingly, the invention is limited only by the following claims.

I claim:

1. A receiver capable of correcting for baseline wander, comprising:
    an analog-to-digital converter coupled to a transmission channel to receive and digitize input signals, the analog-to-digital converter outputting a sample;
    a slicer coupled to receive the sample output from the analog-to-digital converter, the slicer outputting a symbol based on the sample from the analog-to-digital converter; and
    a baseline wander corrector coupled between the analog-to-digital converter and the slicer, wherein the baseline wander corrector receives the symbol and the sample, calculates a baseline correction, and subtracts the baseline correction from the sample output from the analog-to-digital converter.

2. The receiver of claim 1, further including an equalizer coupled between the analog to digital converter and the slicer, the equalizer receiving the sample output from the analog-to-digital converter and outputting an equalized sample to the slicer.

3. The receiver of claim 2, wherein the equalizer includes a linear equalizer.

4. The receiver of claim 2, wherein the equalizer includes a decision feedback equalizer.

5. The receiver of claim 2, wherein the baseline wander corrector includes:
    a wander corrector that receives the symbol and the equalized sample and outputs a baseline correction signal; and
    an adder coupled between the analog-to-digital converter and the equalizer, wherein the adder receives the sample output from the analog-to-digital converter and the baseline correction signal from the wander corrector, and outputs a sample equal to the sample output from the analog to digital converter corrected by the baseline correction signal.

6. The receiver of claim 5, wherein the wander correction digitally implements a transfer function equal to $\mu_b Z^{-1}/(1-Z^{-1})$, where $\mu_b$ is a constant and $Z^{-1}$ represents a one period delay.

7. The receiver of claim 6, wherein $\mu_b$ is less than about 0.05.

8. A receiver capable of receiving killer samples, comprising:
    an analog-to-digital converter coupled to receive signals from a transfer channel, the analog-to-digital converter having a reference voltage terminal;
    a reference voltage generator coupled to receive at least one parameter that is indicative of a cable length, wherein the reference voltage generator outputs the reference voltage to the reference voltage terminal of the analog-to-digital converter in response to the at least one parameter;
    a slicer coupled to an output terminal of the analog-to-digital converter, wherein the slicer receives an input sample from the analog-to-digital converter and outputs a symbol in response to the input sample;
    an amplifier coupled between the transfer channel and the slicer, the amplifier having a variable gain; and
    a gain control coupled to the slicer to receive the sample and the symbol, the gain control generating the variable gain of the amplifier in response to the sample and the symbol.

9. The receiver of claim 8, wherein the at least one parameter of the reference voltage generator includes the variable gain.

10. A receiver capable of receiving killer samples, comprising:
    an analog-to-digital converter coupled to receive signals from a transfer channel, the analog-to-digital converter having a reference voltage terminal;
    a reference voltage generator coupled to receive at least one parameter that is indicative of a cable length, wherein the reference voltage generator outputs the reference voltage to the reference voltage terminal of the analog-to-digital converter in response to the at least one parameter;
    a slicer coupled to an output terminal of the analog-to-digital converter, wherein the slicer receives an input sample from the analog-to-digital converter and outputs a symbol in response to the input sample;
    an equalizer coupled between the analog-to-digital converter and the slicer, the equalizer receiving a signal from the analog-to-digital converter and outputting the sample to the slicer;
    an amplifier coupled between the transfer channel and the slicer, the amplifier having a variable gain; and
    a gain control coupled to the slicer to receive the sample and the symbol, the gain control generating the variable gain of the amplifier in response to the sample and the symbol.

11. The receiver of claim 10, wherein the equalizer includes a linear equalizer.

12. The receiver of claim 10, wherein the equalizer includes a decision feedback equalizer.

13. The receiver of claim 10, wherein the equalizer uses equalizer coefficients and further including an adaptation element coupled to the slicer to receive the sample and the symbol, wherein the adaptation element generates the equalizer coefficients in response to the received sample and the symbol.

14. The receiver of claim 13, wherein the at least one parameter received by the reference voltage generator includes the equalizer coefficients.

15. A receiver capable of receiving killer samples, comprising:
    an analog-t-digital converter coupled to receive signals from a transfer channel, the analog-to-digital converter having a reference voltage terminal;
    a reference voltage generator coupled to receive at least one parameter that is indicative of a cable length, wherein the reference voltage generator outputs the reference voltage to the reference voltage terminal of the analog-to-digital converter in response to the at least one parameter;
    a slicer coupled to an output terminal of the analog-to-digital converter, wherein the slicer receives an input sample from the analog-to-digital converter and outputs a symbol in response to the input sample; and
    a baseline wander corrector coupled between the analog-to-digital converter and the slicer, wherein the baseline wander corrector receives the symbol output from the slicer and the sample input to the slicer, calculates a baseline correction, and subtracts the baseline correction from the sample from the analog-to-digital converter.

* * * * *